Nov. 6, 1923.

G. L. CURLE 1,473,083

MAIN AND AUXILIARY MELTING POT FOR LINOTYPE MACHINES

Filed Sept. 3, 1921

Inventor
Geo. L. Curle
By his Attorneys
Michael Kilgore Kilgore

Patented Nov. 6, 1923.

1,473,083

UNITED STATES PATENT OFFICE.

GEORGE L. CURLE, OF MINNEAPOLIS, MINNESOTA.

MAIN AND AUXILIARY MELTING POT FOR LINOTYPE MACHINES.

Application filed September 3, 1921. Serial No. 498,326.

*To all whom it may concern:*

Be it known that I, GEORGE L. CURLE, am a citizen of the United States, residing at Minneapolis, in the county of Hennepin and State of Minnesota, have invented certain new and useful Improvements in Main and Auxiliary Melting Pots for Linotype Machines; and I do hereby declare the following to be a full, clear, and exact description of the invention, such as will enable others skilled in the art to which it appertains to make and use the same.

My invention relates to linotype machines, such as, for example, the well known Mergenthaler linotype, and has for its object to provide an improved melting pot therefor.

To the above end, generally stated, the invention consists of the novel devices and combinations of devices hereinafter described and defined in the claims.

As is well known, it is of great importance that the molten metal in the melting pot be kept constantly at the correct predetermined temperature for casting of type slugs. To accomplish this it has hitherto been a practise in some instances to provide an auxiliary melting pot in which the original metal bars are melted and in which the used type slugs are remelted, and to arrange such auxiliary melting pot for discharge into the main melting pot. The main melting pot in machines of the Mergenthaler type give a slight movement toward and from the linotype mold but in the old arrangements of the auxiliary melting pot the latter has always been made as a part distinct from the main pot and its housing and did not move with the main melting pot.

In accordance with my invention I accomplish highly improved results in the melting pot mechanism by arranging the main and auxiliary melting pots as a single, self-contained unit and mounting both for common movements. This arrangement further makes it feasible to place the two melting pots within a common housing or heat chamber and sets the two melting pots in a definite, unchanging relation the one in respect to the other and makes it an easier matter to provide the auxiliary pot in the discharge conduit thereof with a controlling valve and to operate this controlling valve by a very simple and efficient means, including a float located in the main pot. The main and auxiliary pots may have independent heating devices for heating the same but in such instance both or all the heat producing elements or devices may be applied to or located within the same housing. This arrangement gives a more economical heating scheme because several heating elements will more or less contribute to the heating of both pots. Also, it naturally locates the two melting pots in very close association.

In the accompanying drawings, wherein like characters indicate like parts throughout the several views, I have illustrated my invention as applied to a melting pot well known to the trade as the Cutler-Hammer linotype pot.

Referring to the drawings.

Figure 1:
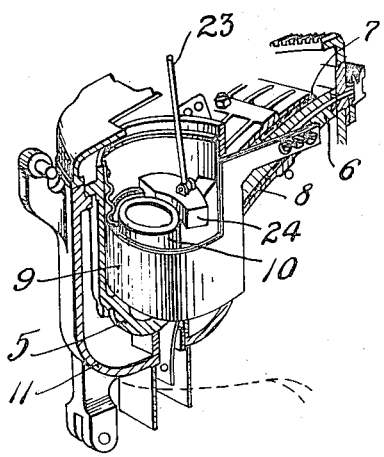
Fig. 1 is a fragmentary sectional perspective showing the main or melting pot proper.
Figure 2:
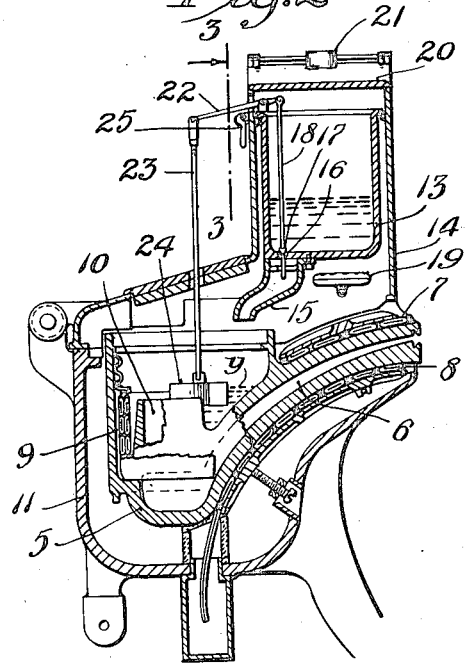
Fig. 2 is a vertical section illustrating my invention applied to a melting pot of the type above stated.
Figure 3:
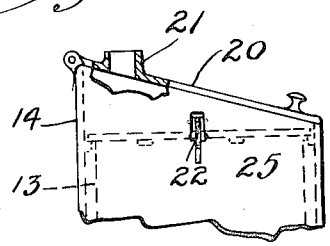
Fig. 3 is a fragmentary view showing parts in the vicinity of the line marked 3—3 on Fig. 2.
Figure 4:
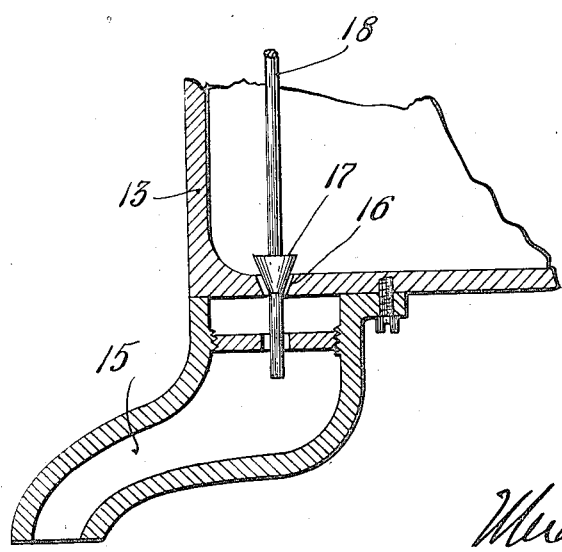
Fig. 4 is a fragmentary perspective on the same line as Fig. 2, but illustrating, on a larger scale, the valve for controlling the discharge of molten metal from the auxiliary melting pot to the main melting pot.

The main melting pot 5, which is of the type above stated, has the customary discharge throat 6, electrical heating elements 7, 8, and 9, pump cylinder 10, and outer casing 11, the pump piston being removed and not shown. The auxiliary pot 13 is mounted in the outer casing 14 suitably supported on the outer casing 11 of the main pot. This auxiliary pot 13 has a depending discharge spout 15 arranged to deliver directly into the main pot 5, and the bottom of said pot 13, leading into said spout 15, has a discharge port 16 adapted to be closed by an upwardly opening check valve 17 secured to an upright valve stem 18. The numeral 19 indicates a gas burner placed within the upper portion of the casing 11 and positioned to properly heat the auxiliary pot 13. The casing 14 has a hinged cover 20 with a vent port 21.

The casings 11 and 14 are connected together so that they form a single complete housing for both melting pots.

The numeral 22 indicates a small lever that extends through an opening in the casing 14, is intermediately pivoted to a lug on said pot 13, and is pivotally connected to the upper end of the valve stem 18. The outer end of the lever 22 is pivoted to a depending rod 23 that works freely through an opening in the cover 12 and is provided at its lower end with a float 24 that floats on the molten metal $y$ within the main pot 5.

The float 24 is preferably a hollow sheet metal element of segmental form, which will float freely in the pot 5 between the wall thereof and the pump cylinder 10.

To lock valve 16 in a closed position a lever equipped eccentric 25 is pivoted to a casing 14 and when turned upward is operative on lever 22.

The operation of the device above described is probably obvious, but may be briefly described as follows:

The molten metal in the main pot 5 will be kept in the proper desired temperature in the customary way. The solid type metal bars will be placed in the auxiliary pot 13 and therein reduced to molten condition and kept in molten condition. Whenever the metal $y$ in the main pot 5 falls below a predetermined level, the float 24 will lower, thereby lifting the valve 17 and opening the port 16 so that the molten metal from the auxiliary pot will then run into the main pot. As soon as the level of the molten metal $y$ in the main pot 5 is slightly raised, the float 24 will be raised, thereby closing the valve 17 and temporarily cutting off the discharge of molten metal from the auxiliary pot to the main pot.

By the means above described, molten metal will be automatically supplied to the main pot and the level of the molten metal in the main pot will be automatically maintained. This operation makes it possible and, in fact, an easy manner to maintain the molten metal in the main pot at the proper constant predetermined temperature suitable for producing the best kind of cast linotype slugs.

The complete melting pot structure above described, as is evident, constitutes a self-contained unit which can be made, handled, applied and used as such and in which all the elements are connected once for all or at any rate are in effect by the application of the melting pot structure to the machine or the removal thereof from such machine.

The auxiliary pot and associated devices may be very easily applied to melting pots already in use and, of course, may be designed as parts of new melting pots.

The two melting pots and their casings are designed and connected as a self-contained unit which adapts the two to be handled and used as an entirety.

What I claim is:

1. The combination of the main melting pot of the character indicated, the same being moveable laterally, of an auxiliary melting pot connected to and moveable with the said main pot and arranged to reduce solid metal to molten condition and to discharge the same into said main melting pot.

2. The construction defined in claim 1 in further combination with a housing that supports and contains both of said melting pots.

3. The combination with a main melting pot of the character indicated, the same being movable laterally, of an auxiliary melting pot connected to and moving with said main melting pot and arranged to reduce solid metal to molten condition and to discharge the same into said main melting pot, in further combination with a valve for controlling the discharge of the molten metal from said auxiliary pot into said main pot, and a float within said main pot having an operating connection to said valve, whereby said valve will be automatically opened and closed to maintain an approximately constant level of molten metal in said main pot.

4. The construction defined in claim 2 in further combination with a valve for controlling the discharge of molten metal from said auxiliary pot into said main pot and a float within said main pot having an operating connection to said valve whereby said valve will be automatically opened and closed to maintain an approximately constant level of molten metal in the said main pot.

In testimony whereof I affix my signature.

GEORGE L. CURLF.